US011943426B2

(12) United States Patent
Hagemann et al.

(10) Patent No.: US 11,943,426 B2
(45) Date of Patent: Mar. 26, 2024

(54) METHOD FOR ASSESSING A CAMERA CALIBRATION

(71) Applicant: Robert Bosch GmbH, Stuttgart (DE)

(72) Inventors: Annika Hagemann, Hildesheim (DE); Moritz Michael Knorr, Hildesheim (DE)

(73) Assignee: ROBERT BOSCH GMBH, Stuttgart (DE)

(*) Notice: Subject to any disclaimer, the term of this patent is extended or adjusted under 35 U.S.C. 154(b) by 375 days.

(21) Appl. No.: 17/445,770

(22) Filed: Aug. 24, 2021

(65) Prior Publication Data

US 2022/0086425 A1    Mar. 17, 2022

(30) Foreign Application Priority Data

Sep. 14, 2020  (DE) .......................... 102020211502.8

(51) Int. Cl.
*H04N 17/00*    (2006.01)
*G06T 7/00*     (2017.01)
*G06T 7/80*     (2017.01)

(52) U.S. Cl.
CPC ......... *H04N 17/002* (2013.01); *G06T 7/0002* (2013.01); *G06T 7/80* (2017.01); *G06T 2207/20021* (2013.01)

(58) Field of Classification Search
CPC ....... H04N 17/002; G06T 7/0002; G06T 7/80; G06T 2207/20021; G06T 2207/30204
See application file for complete search history.

(56) References Cited

U.S. PATENT DOCUMENTS

| 2007/0146391 A1* | 6/2007 | Pentenrieder | G06T 7/80 |
| | | | 345/633 |
| 2014/0218540 A1* | 8/2014 | Geiss | H04N 23/741 |
| | | | 348/181 |
| 2021/0233277 A1* | 7/2021 | Raag | G06T 7/85 |

\* cited by examiner

*Primary Examiner* — Molly Wilburn
(74) *Attorney, Agent, or Firm* — NORTON ROSE FULBRIGHT US LLP; Gerard A. Messina

(57) ABSTRACT

A method for assessing a camera calibration. In the method, a first quality measure is ascertained, a systematic error having to be assessed using the first quality measure, the assessment being carried out with respect to errors remaining after a calibration, an overall calibration object including at least one calibration object being virtually segmented into calibration objects, a detector noise being estimated for each calibration object, which are combined to form an overall estimate, which is compared with an estimate of the detector noise of the overall calibration object.

8 Claims, 5 Drawing Sheets

METHOD FOR ASSESSING A CAMERA CALIBRATION

CROSS REFERENCE

The present application claims the benefit under 35 U.S.C. § 119 of German Patent Application No. DE 102020211502.8 filed on Sep. 14, 2020, which is expressly incorporated herein by reference in its entirety.

FIELD

The present invention relates to a method for assessing a camera calibration and to a system for carrying out the method.

BACKGROUND INFORMATION

Photographic apparatuses, referred to as cameras, are able to record static or moving images on a photographic film or electronically on a memory medium or to convey them via an interface.

A measuring process, referred to as calibration, is used to establish a deviation of one measuring device with respect to another device, a reference device. This deviation is then taken into account in the subsequent use of the measuring device for correcting the read values. Thus, within the scope of the calibration of a camera, the mapping behavior thereof is established as compared to the mapping behavior of a reference camera.

A prerequisite for the use of camera systems as measuring instruments is that their geometric mapping behavior is precisely known. Specifically, this means that the mapping function, i.e., the projection of a point from the three-dimensional world into the two-dimensional image (p: $\mathbb{R}^3 \to \mathbb{R}^2$, $x=(x, y, z)^T \to u=(u,v)^T$, must be known. Errors in the determination of the parameters of this mapping function or the selection of an unsuitable model may have a serious impact on all subsequent processing steps.

With the ever increasing use of cameras system comes also an increased need for methods for determining these model parameters. This should also be able to be carried out by laypersons.

Two known problems in terms of camera calibration are firstly systematic errors, in which the model is unable to describe or able to only insufficiently exactly describe the actual mapping behavior, and secondly high or unknown residual parameter uncertainties, which are typically the result of too few measurements or observations. To be able to recognize these two types of errors requires expert knowledge and experience, for example, with regard to how similar camera systems behave, or complex control experiments as they are known in photogrammetry.

SUMMARY

A method and a system for assessing a camera calibration are provided in accordance with the present invention. Specific embodiments of the present invention result from the disclosure herein.

In accordance with an example embodiment of the present invention, the method used to assess a camera calibration, the method being used for the purpose of assessing a systematic error and to that end to ascertain an initial quality measure, which enables an assessment of the systematic error.

A systematic error $\varepsilon_{bias}$ is to be assessed with the first quality measure, the assessment being carried out with respect to errors remaining after a calibration, an overall calibration object potentially made up of multiple calibration objects being virtually segmented into physically smaller calibration objects, a detector noise being estimated for each calibration object, which are combined to form an overall estimate, which is compared with an estimate of the detector noise of the overall calibration object.

With regard to detector noise, it is stated: a detector or feature detector is an algorithm of image processing, which extracts the position or the image coordinates of distinctive points in the image (features). In the camera calibration, the features are typically the corners of the checkerboard-like calibration target. Reference is therefore made to corner detectors. The detection of features is generally not perfect, i.e., the extracted image coordinates (u, v) deviate from the true image coordinates. These deviations are typically described as uncorrelated noise, the so-called detector noise.

An example embodiment of the present invention provides a method, which makes it possible to assess or to estimate the aforementioned systematic error and thus to be able to take this error into account.

In addition to the systematic error, there is also a so-called statistical error, for the assessment of which in an embodiment of the method a second quality measure is ascertained. Thus, a specific embodiment of the described method is presented herein, in which two informative error and uncertainty measures, which are based purely on the photos or measurements made for the calibration, are taken into account. Thus, it is provided in an embodiment to provide two quality measures and a method for determining these two quality measures, which quantitatively assess firstly systematic errors and secondly residual uncertainties. The combination of these quality measures permits both a direct feedback to the person carrying out the calibration as well as the assessment of calibration methods and structures existing or under design.

In accordance with an example embodiment of the present invention, in the method, an expected value for a mapping error is then ascertained when taking the second quality measure into account, optimal model parameters and their covariance matrix being initially accessed, then a matrix of a mapping error being determined and finally the expected value of the mapping error being ascertained.

A mapping error is understood to mean the difference in mapping behavior between the camera model estimated typically within the scope of the calibration and the true camera.

The expected value of the mapping error is the so-called uncertainty metric. The second quality measure considered here is the uncertainty metric. Thus, it is quantified how uncertain one is regarding the estimated model parameter. This uncertainty metric therefore corresponds at the same time to a measure for the statistical error to be expected. High parameter uncertainty results statistically in higher errors. The definition or form of the uncertainty metric involves that an expected value of a mapping error is determined. Thus, the expected mapping error is deduced from the uncertainty in the model parameters.

The mapping error used may, for example, be a mean square error in the image space. Alternatively, a mean square error in a local image area may also be used or else the error in a specific application of the calibrated camera.

The matrix determined may, for example, be a matrix that describes the increase of the mapping error as a function of the error in the model parameters.

After the detailed description of the quality measure, these are also demonstrated here in a feasibility study, a so-called proof-of-concept.

The assessment of a camera calibration takes place typically with respect to the errors remaining after the calibration, namely, residues, i.e., the differences between the observations and the prediction by the estimated model. In most cases, the root of the mean error square sum, the so-called root mean squared error (RMSE), or a similar measure is specified, which reflects the mean error on the calibration data set.

The following applies:

$$RMSE = \sqrt{\frac{1}{n_{obs}} \sum_{k=1}^{n_{obs}/2} \|u_i - \hat{u}_i\|^2}, \quad (1)$$

$u_i$ being the observed pixels and $\hat{u}_i$ being the pixels estimated on the basis of the model. The number of the individual observations is $n_{obs}$, each observed pixel ($u_i=(u, v)^T$) being contributed in accordance with two observations.

The residues are made of a systematic error, for example, resulting from a non-modeled distortion, and a stochastic error resulting from the so-called detector noise. The detection of the checkerboard corners in the accompanying figures is subject to random and uncorrelated errors.

The following applies asymptotically for the RMSE:

$$RMSE = \sigma \underbrace{\sqrt{1 - \frac{n_{params}}{n_{obs}}}}_{\text{statistical error}} + \underbrace{\epsilon_{bias}}_{\text{systematic error}}, \quad (2)$$

and.:

$$RMSE^2 = \underbrace{\sigma^2 \left(1 - \frac{n_{param}}{n_{obs}}\right)}_{\text{statistical error}} + \underbrace{\epsilon_{bias}^2}_{\text{systematic error}}, \quad (3)$$

depending on the type of error, $\sigma$ describing the detector noise, $n_{param}$ describing the number of parameters of the model and $\epsilon_{bias}$ describing the systematic error. In general, however, it remains unclear how high the individual contributions ($\sigma$ and $\epsilon_{bias}$) are. This presents a general problem, since $\sigma$ is typically different for various camera optics combinations. Thus, empirical values from earlier calibrations of the same camera system, typically with the same settings such as aperture and sharp definition, are typically required for evaluating a camera system on the basis of the RMSEs. Moreover, the RMSE includes no information regarding the accuracy with which the model parameters may be estimated on the basis of the present data.

The covariance of the parameters from the optimization is typically utilized in order to evaluate the uncertainty of the estimated parameters: The smaller the variance of the parameter, the more certain one is regarding its value. The variances of individual parameters are poorly suited as a quality measure, however, since there is a multitude of camera models having different parameters. This results in a lack of comparability. In order to improve this, there is already a method for propagating the parameter uncertainty via a Monte-Carlo simulation into the image space and in this way to estimate a maximum uncertainty in the image. Moreover, a method has been introduced, in which the uncertainty of the model parameters, here quantified via the approximated Hesse matrix, is weighted with the influence of the parameters on the camera model.

The method provided herein in its different specific embodiments differs significantly from the aforementioned approaches as is described in detail below.

The method presented makes it possible, at least in one embodiment, to provide an informative error and uncertainty measure for assessing calibration body-based camera calibrations. In one specific embodiment, it includes both contributions of the potential error: firstly, systematic (model) errors and secondly, a residual uncertainty or variance. These measures allow a user, through direct feedback, to assess and to improve the calibration in a targeted manner. This may take place, for example, by selecting a more suitable model in the case of a systematic error or by recording additional data in the case of excessive uncertainty.

The error feedback may also be used to estimate errors in subsequent applications, for example, self-localization, triangulation, etc., and to request best possible additional measurements. In addition, the quality measure may also be used for the purpose of assessing, in principle, existing or new calibration methods and calibration structures.

The quality measures provided herein allow for the quantitative assessment of calibrations, the quality measures presupposing no empirical values regarding the present camera or the camera model. Thus, they allow, in particular, laypersons to assess and to potentially directly improve the calibration result. Further advantages are explained in detail below.

Further advantages and embodiments of the present invention result from the description herein and from the figures.

It is understood that the features cited above and those still to be explained below are usable not only in each indicated combination, but also in other combinations or when considered alone, without departing from the scope of the present invention.

DETAILED DESCRIPTION OF EXAMPLE EMBODIMENTS

The present invention is schematically represented in the figures based on specific embodiments and is described in greater detail below with reference to the figures.

Figure 1:
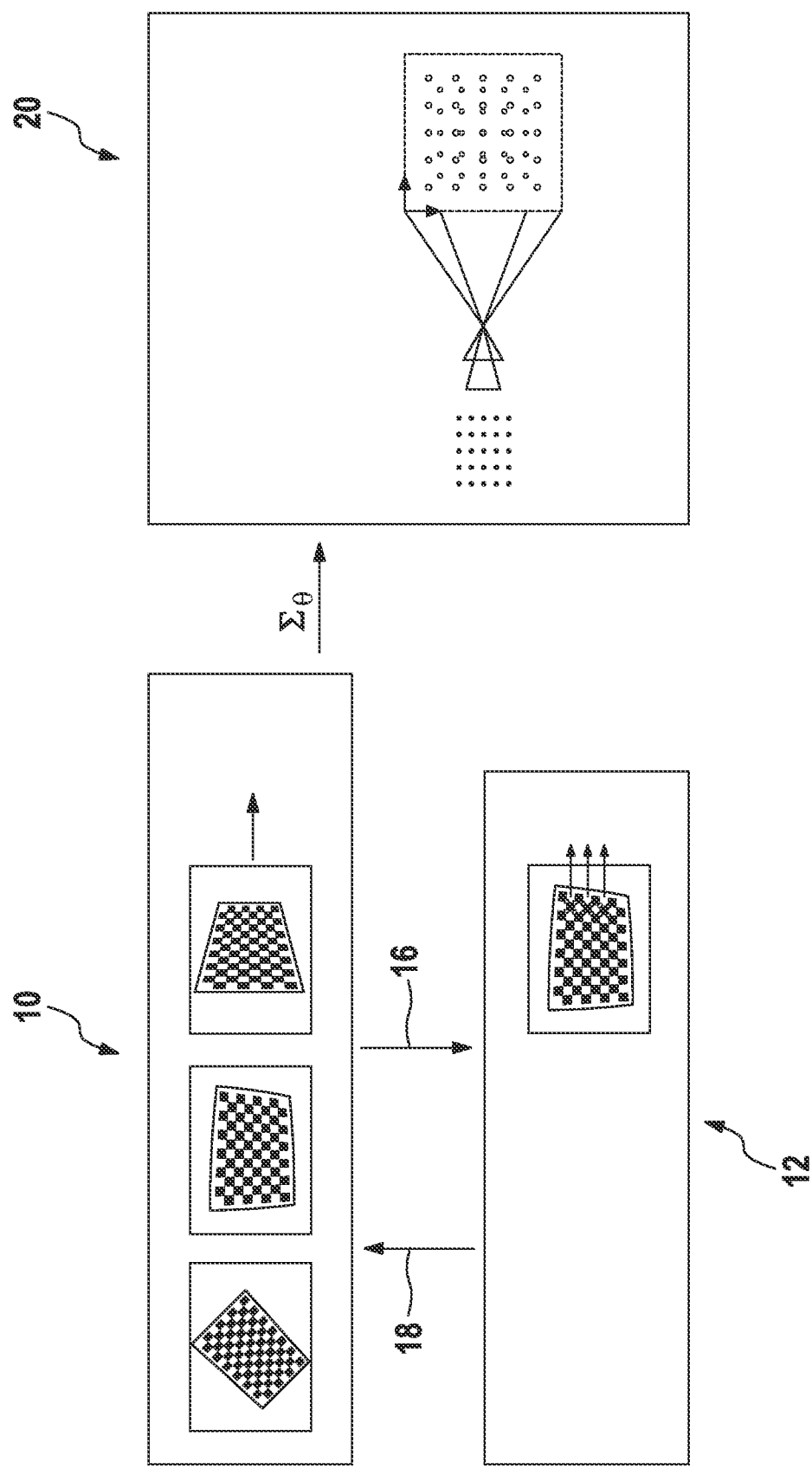
FIG. 1 shows an overview of example embodiments of the method in accordance with the present invention for an error and uncertainty feedback for a camera calibration.

FIG. 1 shows in three representations an overview of the method described for an error and uncertainty feedback for a camera calibration. A first representation shows a camera calibration based on three checkerboard patterns, model parameters being estimated. The results are model parameters, RMSE and a covariance matrix. A second representation 12 illustrates a method for recognizing systematic errors. Incorporated in this representation is the RMSE (arrow 16). An arrow 18 illustrates the adaptation of the model. A third representation 20 illustrates a method for determining the uncertainty in the mapping behavior.

The starting point is a calibration body-based camera calibration, in which the images of well-defined calibration bodies are recorded from various perspectives. On the basis of these images, (i) the position of the camera relative to, for example, multiple calibration bodies in each image is estimated with the aid of extrinsic parameters and (ii) the model parameters of the camera are estimated with the aid of intrinsic parameters θ. The estimate takes place, for example, via a so-called bundle adjustment, a calibration cost function, typically, the rear projection error, being optimized with the aid of a non-linear, least squares method. The results of the optimization are optimal model parameters $\hat{\theta}$, the residues, as well as the covariance matrix of model parameters $\Sigma_\theta$. In connection with such a standard camera calibration, it is possible to use the methods presented herein.

To recognize systematic errors ($\epsilon_{bias}$ in equation (2) and (3)) it is provided to determine an independent estimate of the detector noise, this is identified below by $\hat{\sigma}$. This may then be related to the estimation on the basis of calibration event $\sigma_{calib}$. In a calibration without systematic errors, the relation should be close to one, since $\epsilon_{bias}$ disappears. A value deviating therefrom indicates non-modeled properties or other errors.

For an independent estimate of the detector noise, the influence of systematic errors must be minimized. The method presented is now based on the finding that systematic errors such as, for example, a non-modeled distortion are expressed locally in the image to a lesser degree. The calibration object is therefore segmented virtually into V physically smaller calibration objects, whose poses, i.e., positions and orientation, are each estimated independently. Assuming that the estimates are locally free of systematic errors, namely bias-free, an estimation of the detector noise results for each of the virtual calibration objects according to equation (2, 3):

$$RMSE_v = \sigma_v \sqrt{1 - \frac{n_{param,virt}}{n_{obs,virt}}}, \quad (4)$$

with $\upsilon \in \{1 \ldots V\}$. In a first variant of this method (A1), the checkerboard calibration bodies used for the calibration are segmented into individual tiles, whose poses are then optimized separately. After the calculation of the RMSE values ($RMSE_\upsilon$) on the basis of the residues of each optimization, the pose parameter is then calculated $\sigma_\upsilon$, in this case $n_{obs,virt}=8$, since each tile 4 contributes 4 corners and therefore 8 observations, and $n_{param,virt}=6$ applies, since a pose has 6 degrees of freedom. The individual estimates $\sigma_\upsilon$ are then combined to form an overall estimate $\hat{\sigma}$. This takes place by means of averaging. Once the calibration is carried out, $RMSE_{calib}$ may then be determined according to equation (1). With equation (2) and assuming that no systematic errors are present, the result is $$\sigma_{calib} = \frac{RMSE_{calib}}{1 - \frac{n_{param}}{n_{obs}}}. \quad (5)$$

Figure 2:
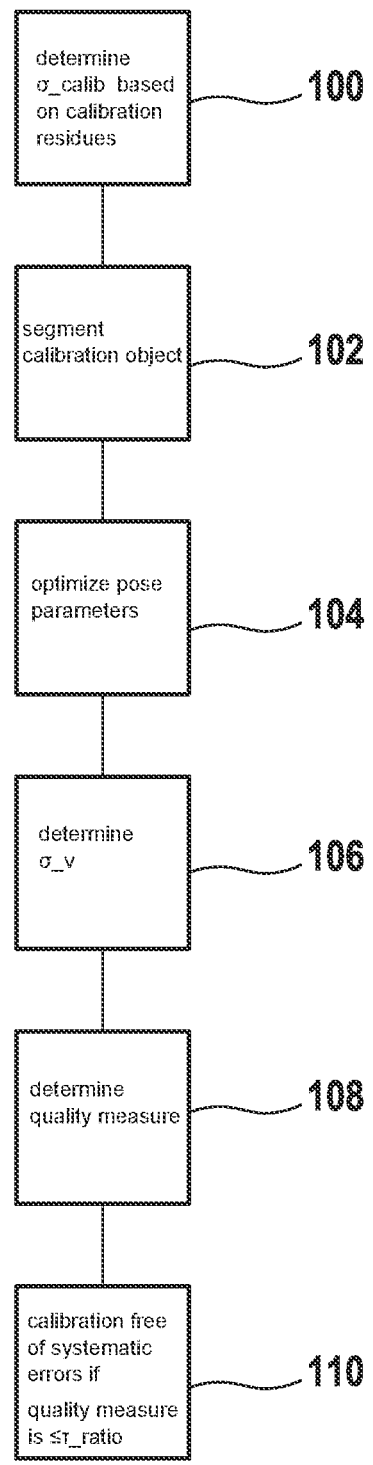
FIG. 2 shows in a flowchart one possible sequence of the method in accordance with an example embodiment of the present invention.

The relation $\sigma_{calib}/\hat{\sigma}$ is then determined. If the calibration was bias-free, then the value should be close to one and, in practice, below a threshold value or threshold $\tau_{ratio}$. The method is summarily reproduced once again below with reference to a flowchart in FIG. 2.

In a first step 100, $\sigma_{calib}$ is determined on the basis of calibration residues $u_i - \hat{u}_i$ with $\epsilon \{1 \ldots n_{obs}/2\}$ according to equation (1) and (5).

In a second step 102, the calibration object is segmented into V virtual, local and independent calibration objects including at least 4 measureable pixels, which corresponds to at least 8 observations.

In a third step 104, the pose parameters of each of the V virtual calibration objects are optimized, the parameters of the mapping behavior of the camera remaining unchanged. The residual errors (residuals) are determined after the optimization.

In a fourth step 106, $\sigma_{\upsilon=}$ is determined from the residuals according to equation (4) $\sigma_\upsilon$, here the residuals of all V virtual calibration bodies being used to calculate the RMSEs.

In a fifth step 108, the quality measure for recognizing systematic errors $\sigma_{calib}/\hat{\sigma}$ is determined.

In a sixth step 110, the calibration is considered to be free of systematic errors (bias-free), if $\sigma_{calib}/\hat{\sigma} \leq \tau_{ratio}$.

Figure 3:
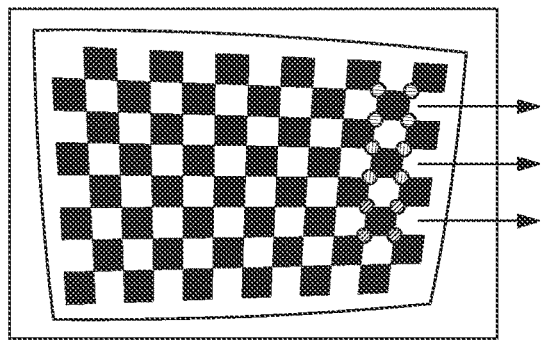
FIG. 3 shows visualizations of the method in accordance with the present invention.
Figure 3:
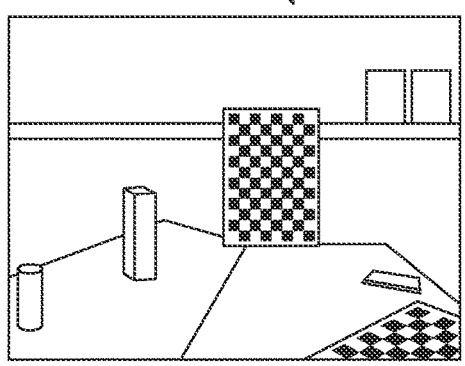
Figure 3:
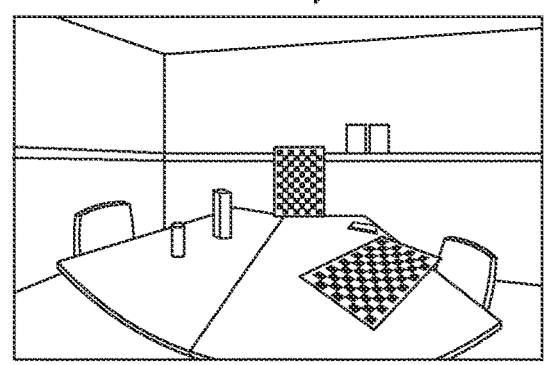
Figure 3:
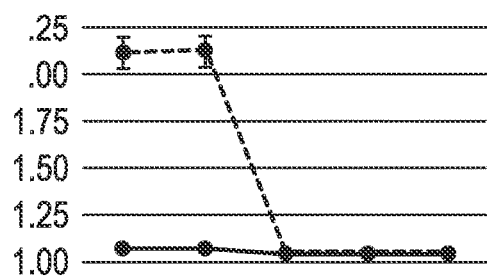
Figure 3:
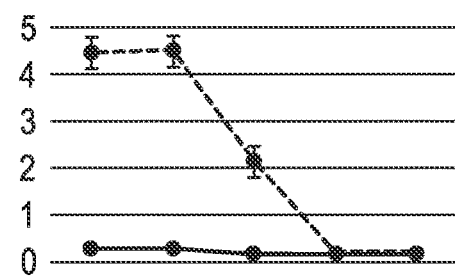

FIG. 3 shows a visualization of the method for recognizing systematic errors. By separately optimizing local groups of data points, it is possible to achieve a virtually bias-free estimate of the detector noise (reference numeral 150). Results for two sample cameras, which have been calibrated using variously complex camera models (reference numeral 152). For camera 1 160, a pinhole camera model including two radial distortion parameters is required, in simpler models, the method recognizes systematic errors. For camera 2, 162, a fisheye model is required.

FIG. 3 shows by way of example the selection of a suitable camera model using this method.

In fact, a systematically disrupted mapping function results in $\hat{\sigma}$ being greater than the actual noise level of detector σ. This presents no problem, however, since $\sigma_{calib}$ is more heavily influenced by systematic errors. In general, robust estimate methods, such as M-Estimator (maximum-likelihood estimator including robust cost function) should be used both for determining the calibration parameters, $RMSE_{calib}$, and $\hat{\sigma}$. Important in this case is the fact that all values are determined on the basis of similar and compatible methods.

The second type of errors in a camera calibration occurs as a result of residual uncertainty in estimated model parameters. The aim of the second quality measure or uncertainty measure is to quantify the uncertainty in the mapping behavior of the camera. Since only the uncertainty of the parameters results from the calibration, it must be quantified how a parameter error Δθ impacts the mapping behavior of the camera.

For this purpose, a mapping error $K(\hat{\theta}, \Delta\theta)$ is defined, which describes the difference in the mapping behavior of two camera models $p_c(x; \hat{\theta})$ and $p_c(x; \hat{\theta}+\Delta\theta)$. In this regard, reference is made to FIG. 1. For each individual pixel $u_i, i=1, \ldots n$ in the image, $r_i = p_c^{-1}(u_i; \hat{\theta})$ is determined by back projection using camera model 1 of the associated eye ray. Subsequently, 3D points on these eye rays are selected and projected back into the image using camera model 2. Mapping error $K(\hat{\theta}, \Delta\theta)$ then quantifies the mean difference in the coordinates of original pixels $u_i$ and of back-projected pixels $\tilde{u}_i, i=1, \ldots n$:

$$K(\hat{\theta}, \Delta\theta) = \frac{1}{2n}\sum_{pixel\ i}^{n}\|u_i - p_C(x_i; \hat{\theta} + \Delta\theta)\|^2 \quad (7)$$

$$= \frac{1}{2n}\sum_{pixel\ i}^{n}\|\Delta u_i\|^2,$$

where $x_i = p_c^{-1}(u_i; \hat{\theta})$ is the 3 D point determined by inverse projection of pixels $u_i$. The mapping error may be expressed as follows via a Taylor approximation up to the $2^{nd}$ order:

$$K(\hat{\theta}, \Delta\theta) \approx \Delta\theta^T H \Delta\theta, \quad (8)$$

the matrix $$H = \frac{1}{2n}J_{res}^T J_{res}.$$

being defined as the product of the Jacobi Matrix $J_{res}$=dres/d$\Delta\theta$ of the residue vector res($\hat{\theta}$, $\Delta\theta$)=$(\Delta u_1^T, \ldots, \Delta u_N^T)^T$.

It may then be mathematically deduced that the expected value of the mapping error of a calibration result $p_c(x, \hat{\theta})$ with covariance matrix $\Sigma_\theta$ as compared to the true (unknown!) camera model $p_c(x; \overline{\theta})$ is provided by:

$$\mathbb{E}[K] = \text{trace}(\Sigma_\theta^{1/2} H \Sigma_\theta^{1/2}). \quad (9)$$

This means that the expected mapping error of the calibration result as compared to the true camera model may be predicted, even though the true camera model is unknown. This expected value trace($\Sigma_\theta^{1/2}/ H\Sigma_{74}^{1/2}$) is the uncertainty metric.

Figure 4:
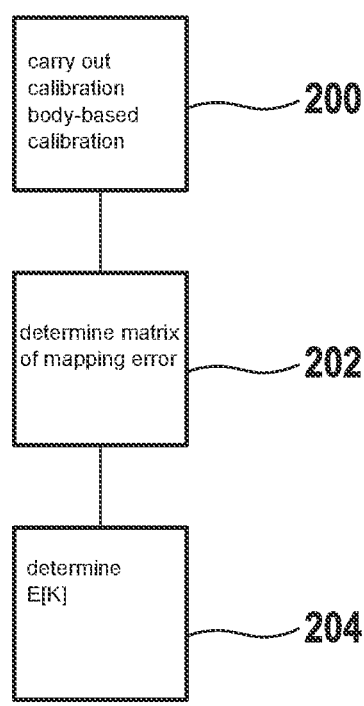
FIG. 4 shows in a flowchart one example embodiment of the method in accordance with the present invention.

The calculation of the uncertainty metric takes place specifically as is explained with reference to the accompanying flowchart in FIG. 4.

In a first step 200, the calibration body-based calibration is carried out and optimal model parameters $\hat{\theta}$ and covariance matrix $\Sigma_\theta$ are determined.

In a second step 202, matrix H of the mapping error is determined:
  implement mapping error $K(\hat{\theta}, \Delta\theta)$ according to equation 7 as a function of estimated model parameters $\hat{\theta}$ and of a parameter error $\Delta\theta$.
  determine Jacobi Matrix $J_{res}$=dres/d$\Delta\theta$ of mapping error K at the point of optimal model parameters $\hat{\theta}$ via numerical approximation.
  determine $$H = \frac{1}{2n}J_{res}^T J_{res}$$

In a third step 204, $\mathbb{E}[K]=\text{trace}(\Sigma_\theta^{1/2}H\Sigma_{74}^{1/2})$ is determined.

One example for the use of the uncertainty metric is given below. Depending on the data set, the calibration remains an uncertainty. This is a function of the number of recordings and of the information content of the recordings. Examples of informative and less informative recordings are shown above. The uncertainty matrix presented indicates after one calibration how high the error to be expected is in the image. This decreases with the number of data points and with the information content of the data.

Figure 5:
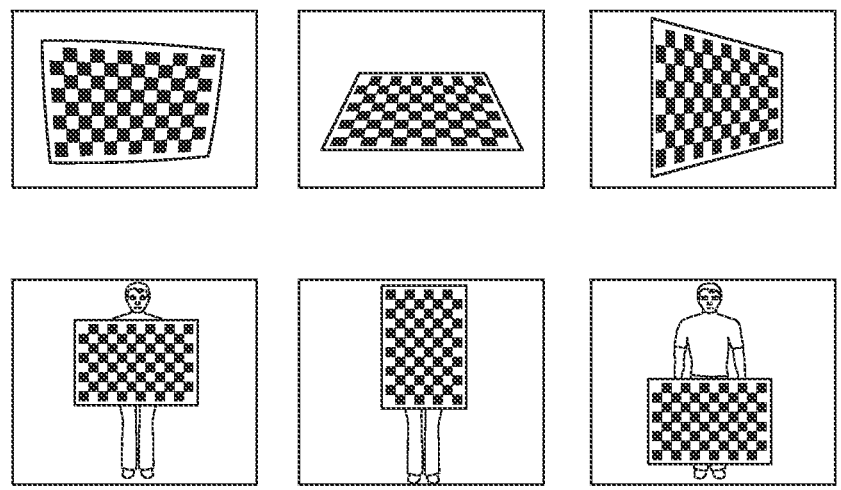
FIG. 5 shows an example of the use of an uncertainty metric.
Figure 5:
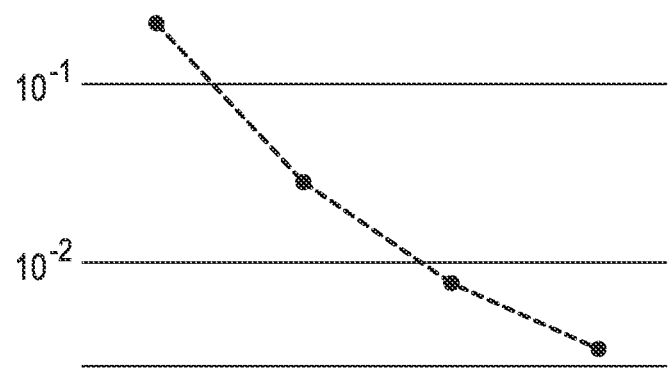

FIG. 5 in the following section shows by way of example how the metric quantifies the residual uncertainty for calibrations using different data sets.

This method may be clearly differentiated from the existing methods for quantifying the uncertainty.

The calculation of the metric presented requires no complex Monte-Carlo simulation. Instead of a maximum error in a selected set of points, a mean error occurs across all pixels. The method provided herein makes it possible to consider possible compensations using extrinsic parameters, as well as application-specific adaptations of the mapping error to be predicted.

The observability indicates the increase of the calibration cost function in the most poorly observable parameter direction. In contrast, the method provided herein considers the uncertainty of all parameter directions (not only the most poorly observable parameter direction). Moreover, the metric provided herein is more readily interpretable: the error to be expected is determined in the image space, while the observability indicates an increase of the calibration cost function.

The behavior of both measures is represented below based on real experiments.

In FIG. 3, it is initially shown using two cameras, how it may be decided purely on the basis of relation $\sigma_{calib}/\hat{\sigma}$ whether a mapping model is sufficient. For this purpose, the two cameras have been calibrated in each case using camera models increasing in complexity. The graphic representations in FIG. 3 below show camera models on the x-axis of increasing complexity and the corresponding values of $\sigma_{calib}$ (dashed line) and $\hat{\sigma}$ (solid line) on the y-axis. Values $\sigma_{calib}$ and $\hat{\sigma}$ in this case have been determined by robust estimation on the basis of the median absolute deviation method (MAD) and are therefore identified by calibration MAD and detector MAD. It may be seen how the values of calibration MAD and detector MAD become nearly identical with increasing model complexity (ratio approximately one). This shows that these models are able to describe the mapping behavior free of systematic errors under the given observations. The absolute values in this case are not significant and may widely fluctuate. For this reason, expert knowledge and empirical values were always required in the past for the specific camera model. The virtual segmentation of the calibration body into individual tiles (variant 1A) is shown once again at the top in FIG. 3.

FIG. 5 shows by way of example the application of the uncertainty measure. In general, the residual uncertainty of a calibration is a function of the calibration data set. The more recordings and the more informative the recordings, the less is the residual uncertainty. FIG. 5 shows the calibration of camera 1 (FIG. 3, 160).

A pinhole camera model including two radial distortion parameters has been used. Photos in which the calibration body in the image is large and in which the body has extreme angles of inclination relative to the camera, are particularly informative. Less informative are photos in which the body is far away and is positioned frontoparallel to the camera. Laypersons frequently take unsuitable (uninformative) photos. In return, the uncertainty metric provided herein offers a direct feedback (FIG. 5 below): when calibrating with few and uninformative photos, the expected mapping error is significantly higher than in the case of many and informative photos. Depending on the application, it may then be decided whether the calibration is already sufficiently exact, or whether more measurements are required. The absolute value of the metric is independent, in particular, of the selected camera model and is therefore comparable over a wide variety of calibrations.

The quality measures provided herein allow for the quantitative assessment of calibrations, the quality measures presupposing no empirical values with respect to the present camera or the camera model. Thus, they allow lay users, in particular, to assess and to potentially directly improve the calibration result. Further advantages are cited in detail below.

Recognition and Quantification of Systematic Errors:

Previously used measures such as, for example, RMSE, contain a mixture of stochastic errors (detector noise) and systematic errors. Since the stochastic error varies depending on the camera and depending on the corner detector, it is not apparent from the previously used measures whether a systematic error or only strong noise is present. The method provided herein enables the independent estimation of the noise and thus the decoupling of both portions.

Virtually all types of systematic errors such as, for example, an inadequate camera model, false imaging assignment, errors in the calibration body, etc., may be recognized with the method.

The recognition and quantitative assessment take place without the addition of new data or of a reference experiment, as is otherwise customary in photogrammetry but requiring great additional effort.

The measure presented is independent of the underlying camera model and may therefore be used in general.

The measure presented presupposes no empirical values for examined cameras. This would be the case, for example, in an analysis based purely on the RMSE.

Quantification of the Residual Uncertainty

The residual uncertainty is indicated typically via the (co)variance of the camera model parameters, or via the sum of these variances. There is, however, a multitude of different camera models, ranging from simple pinhole cameras including three parameters up to and including local camera models including approximately $10^5$ parameters. The specification of parameter uncertainties is therefore difficult to interpret and is not comparable across camera models. The method provided propagates the parameter uncertainty in the image space and offers as a result an interpretable and comparable measure for the uncertainty in the image.

The method enables a flexible adaptability of the reference experiment: depending on the application, for example, the expected mean error in a particular image area may be predicted. Instead of the error in the image space, the error in the angles of the camera eye rays may also be predicted. A specific application, for example, triangulation, self-localization, etc., may also be defined as a reference experiment. This then provides, for example, the square triangulation error to be expected.

The metric may be utilized to request best possible additional measurements. In this way, the expected error in the image space may be reduced as quickly as possible.

The calculation of the metric provided herein requires no complex Monte-Carlo simulation. Instead of a maximum error in a selected set of points, a mean error occurs across all pixels. The method provided herein makes it possible to consider possible compensations using extrinsic parameters, as well as other application-specific adaptations of the mapping error to be predicted.

The observability indicates the increase of the calibration cost function in the most poorly observable parameter direction. In contrast, the method provided herein considers the uncertainty of all parameter directions (not only the most poorly observable parameter direction). Moreover, the metric provided herein is more readily interpretable: the error to be expected is determined in the image space, whereas the observability indicates an increase of the calibration cost function.

Recognition of Systematic Errors (1B) In general, various methods for estimating values $\sigma_{calib}$ and $\sigma_\upsilon$ may be used. In practice, the use, in particular, of robust estimators such as M-estimators, or Median Absolute Deviation is important.

(1C) The calibration object may be segmented in various ways into virtual calibration objects. In general, it is only the case that more than six independent observations must be present for the estimate to be overdetermined. In the case of exactly six observations, the pose parameters could be estimated, although $\sigma_\upsilon$ could not be determined, since $RMSE_\upsilon=0$ would apply. Groups of six corners, for example, could also be used.

(1D) The method is not limited to planar or checkerboard-like calibration bodies. Calibration bodies that include circular markings not situated on one plane may, for example, also be used. The only prerequisite is that the relative position of the individual markings to one another is known. When calibrating only one camera, even knowledge of the overall dimension (scale) of the calibration body is not required in some cases.

(1E) Alternative quality measures may also be calculated from $\sigma_{calib}$ and $\hat{\sigma}$, for example $$g_1 = \frac{\hat{\sigma}}{\sigma_{calib}} \tag{10}$$

$$g_2 = \sigma_{calib} - \hat{\sigma} \tag{11}$$

$$g_3 = 100\% \frac{\sigma_{calib}}{\hat{\sigma}} \tag{12}$$

$$g_4 = \frac{\sigma_{calib} - \hat{\sigma}}{\hat{\sigma}}, \tag{13}$$

or more generally $$g_5 = f(\sigma_{calib}, \hat{\theta}). \tag{14}$$

(1F) In addition, there is the possibility of computing bias term $\epsilon_{bias}$ directly. For this purpose, $RMSE_{calib}$ and $\hat{\sigma}$ in equation (2) are used and reshaped to $$\epsilon_{bias} = RMSE_{calib} - \hat{\sigma}\sqrt{1 - \frac{n_{param}}{n_{obs}}}. \tag{15}$$

Thus, further alternative quality measures may be defined, such as $$g_6 = \frac{\epsilon_{bias}}{RMSE_{calib} - \epsilon_{bias}} \tag{16}$$

$$g_7 = 100\% \frac{\epsilon_{bias}}{RMSE_{calib} - \epsilon_{bias}} \tag{17}$$

$$g_8 = \frac{\epsilon_{bias}}{RMSE_{calib}} \tag{18}$$

$$g_9 = \frac{RMSE_{calib}^2 - \hat{\sigma}^2\left(1 - \frac{n_{param}}{n_{obs}}\right)}{RMSE_{calib}^2} \tag{19}$$

$$g_{10} = 100\% \frac{\epsilon_{bias}}{RMSE_{calib}}. \tag{20}$$

(1G) A further manner of defining a quality measure results from the prediction of the RMSE $$R\widehat{MSE}_{calib} = \hat{\sigma}\sqrt{1 - \frac{n_{param}}{n_{obs}}} \quad (21)$$

and to relate this to $RMSE_{calib}$.

$$g_{11} = \frac{RMSE_{calib}}{R\widehat{MSE}_{calib}} \quad (22)$$

$$g_{12} = \frac{RMSE^2_{calib}}{R\widehat{MSE}^2_{calib}} \quad (23)$$

$$g_{13} = \frac{RMSE_{calib} - R\widehat{MSE}_{calib}}{R\widehat{MSE}_{calib}} \quad (24)$$

$$g_{14} = \frac{RMSE_{calib} - R\widehat{MSE}_{calib}}{RMSE_{calib}}. \quad (25)$$

Some of the above formulations may be mathematically equivalent and differ only in the derivation.

Quantification of the Residual Uncertainty (2B) In order to accelerate the calculation, it is possible to determine mapping error $K(\hat{\theta}, \bar{\theta})$ across a subset of pixels instead of across all pixels (for example, a homogenous grid distributed across the image area).

(2C) In particular application scenarios, only limited image areas are relevant. In this case, mapping error $K(\hat{\theta}, \bar{\theta})$ may be determined only across pixels in this image area instead of across all pixels. Moreover, image areas may also be weighted to various degrees.

(2D) Depending on the application, it may be taken into account in the case of mapping error $K(\hat{\theta}, \bar{\theta})$ that differences in intrinsic parameters may frequently be compensated for by a different selection of the extrinsic parameters (of the position of the camera). In such cases, the mapping error is therefore less than the error indicated by equation 6. The alternative formulation taking the extrinsic into account is:

$$K = \frac{1}{N}\sum_{pixel\ i}^{N}\left\|u_i - p_C([R/t]x_i; \hat{\theta} + \Delta\theta)\right\|^2 \quad (26)$$

with 3D points $x_i = p_C^{-1}(u_i; \hat{\theta})$, (27)

and extrinsic $[R/t] = \min_{[R/t]} K$. (28)

(2E) Instead of the mean error in the image, it is possible to predict the mean error in the angles of the eye rays. Mapping error $K(\hat{\theta}, \bar{\theta})$ in this case defines not the mean difference in the image space (equation 7), but the mean difference in angles.

(2F) The expression $\mathbb{E}[K]=\text{trace}(\Sigma_{74}^{1/2} H \Sigma_{74}^{1/2})$ may also be formulated as follows (mathematical equivalent):

$$\mathbb{E}[K]=\text{trace}(\Sigma_{74} H), \quad (29)$$

$$\mathbb{E}[K]=\text{trace}(H\Sigma_{74}), \quad (30)$$

$$\mathbb{E}[K]=\Sigma_{i=1}^{N}\lambda_i, \quad (31)$$

where $\lambda_i$ are the eigenvalues of matrix $\Sigma_{74}^{1/2} H \Sigma_{\theta}^{1/2}$.

(2G) Instead of the expected value of mean square error $\mathbb{E}[K]$ (in pixel$^2$ units), the square root thereof $$\sqrt{\mathbb{E}[K]} = \sqrt{\text{trace}\left(\sum_{\theta}^{1/2} H \sum_{\theta}^{1/2}\right)}$$

(in pixel units) may be used.

This is potentially even more easily interpretable.

(2H) More generally, an arbitrary function $f(\mathbb{E}[K])$ may be used.

What is claimed is:

1. A method for assessing a camera calibration, ascertaining a first quality measure;
assessing a systematic error using the first quality measure, the assessment being carried out with respect to errors remaining after a calibration;
virtually segmenting an overall calibration object including at least one calibration object into calibration objects;
estimating a detector noise for each of the calibration objects;
combining the detector noise for each of the calibration objects to form an overall estimate; and
comparing the combined detector noise with an estimate of detector noise of the overall calibration object.

2. The method as recited in claim 1, wherein an assessment of a model selection is carried out.

3. The method as recited in claim 1, wherein the estimate of the detector noise of the overall calibration object is obtained by an averaging.

4. The method as recited in claim 1, wherein an optimization is initially carried out before the assessment of the calibration to obtain optimal model parameters and a covariance matrix.

5. The method as recited in claim 4, wherein a second quality measure is ascertained, a statistical error being assessed using the second quality measure.

6. The method as recited in claim 5, wherein the second quality measure is ascertained by ascertaining an expected value for a mapping error, optimal model parameters and their covariance matrix initially being accessed, then a matrix of a mapping error is determined and finally the expected value of the mapping error is ascertained.

7. The method as recited in claim 1, wherein a user is provided a direct feedback to assess the calibration.

8. A system for assessing a camera calibration, the system configured to:
ascertain a first quality measure;
assess a systematic error using the first quality measure, the assessment being carried out with respect to errors remaining after a calibration;
virtually segment an overall calibration object including at least one calibration object into calibration objects;
estimate a detector noise for each of the calibration objects;
combine the detector noise for each of the calibration objects to form an overall estimate; and
compare the combined detector noise with an estimate of detector noise of the overall calibration object.

* * * * *